United States Patent Office 3,530,356
Patented Sept. 22, 1970

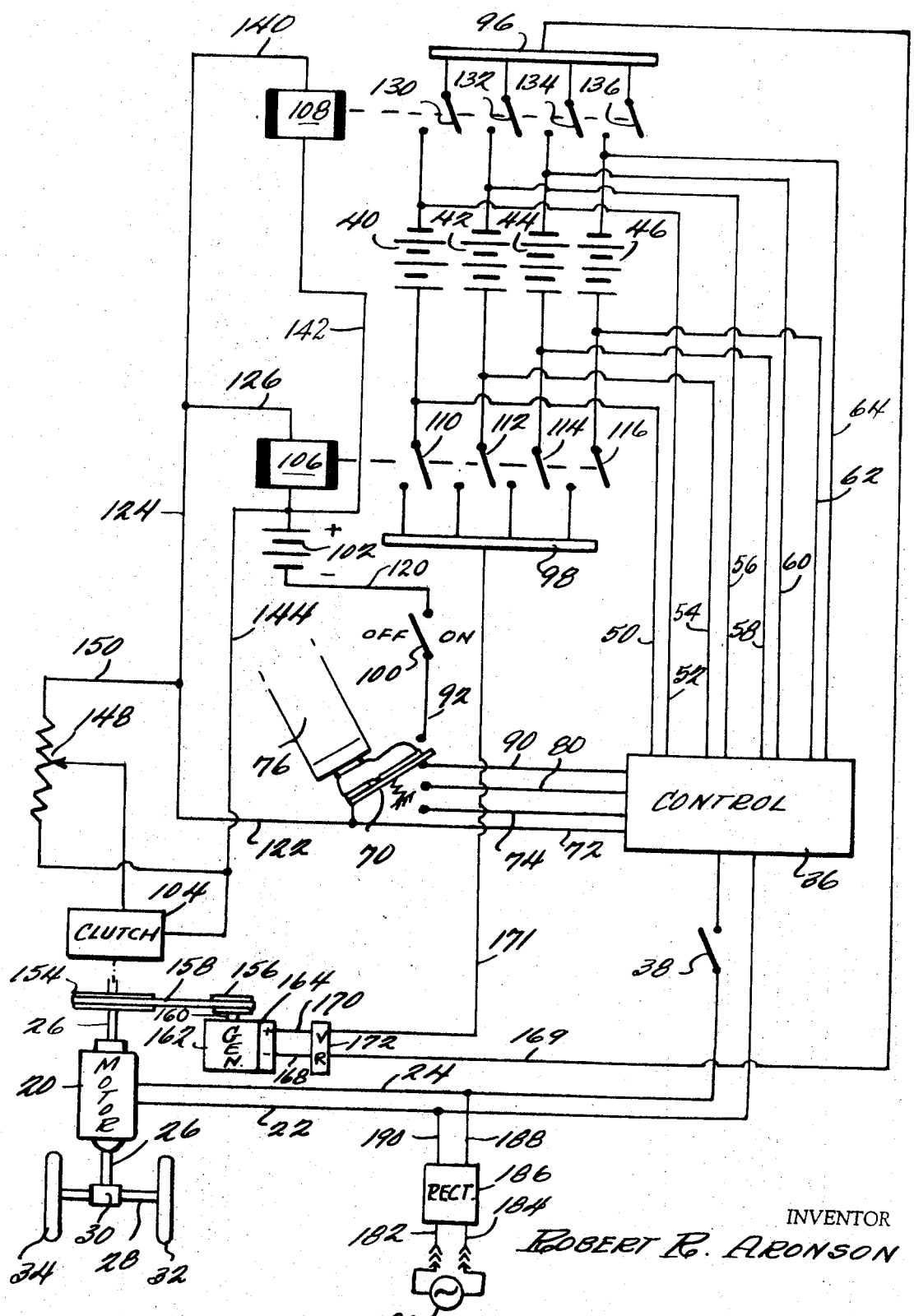

3,530,356
REGENERATIVE SYSTEM FOR ELECTRIC VEHICLE
Robert R. Aronson, Ferndale, Mich., assignor to Electric Fuel Propulsion, Incorporated, Ferndale, Mich., a corporation of Delaware
Filed Dec. 26, 1967, Ser. No. 693,433
Int. Cl. H02j 7/14
U.S. Cl. 320—61                                8 Claims

ABSTRACT OF THE DISCLOSURE

The invention relates to an electrical system for an electric automobile or vehicle whereby the storage batteries are recharged whenever the accelerator control is in a predetermined position and the vehicle is in motion or the batteries are being recharged from an exterior source of voltage. In one embodiment, the motor mechanically drives an alternator which produces alternating current which is rectified to recharge the storage batteries. The motor may also be excited by an external source to drive the alternator and recharge the batteries.

DESCRIPTION OF THE PRIOR ART AND SUMMARY OF THE INVENTION

This invention relates to a regenerative braking system for an electric automobile or vehicle whereby some of the kinetic energy of the automobile is recovered during braking by operating the regenerative braking apparatus whenever the accelerator control is in a predetermined position.

Around the turn of the century, three types of automobiles were running neck and neck in the United States—the steam automobile, the electric automobile, and the gasoline automobile. The gasoline automobile finally outdistanced its rivals and set the style for an enormous industry and a way of life. The same problems which plagued the electric automobile at the beginning of the twentieth century have still not been wholly solved, although the weight, range, speed, and acceleration of electric automobiles have been improved substantially, both by improvements in conventional lead acid batteries and by inventions of radically different batteries. In addition, techniques for conserving what energy can be stored have been developed and revived to further increase the efficiency and hence the practicality of the electric automobile.

One of these revived techniques is regenerative braking, the recovery of the acceleration power stored in the vehicle as kinetic energy with braking as a desirable, but incidental, result. In a conventional gasoline automobile kinetic energy is uselessly dissipated as heat when the brakes are applied, and thus a substantial portion of the energy liberated by the explosion of the gasoline vapors is wasted. In an electric vehicle, this kinetic energy can be recovered by the same action which brakes the vehicle.

In order to recover as much energy as possible, the time which elapses between the desire to brake and the actual commencement of regenerative braking must be as small as possible. This invention satisfies this requirement by activating the regenerative apparatus whenever the accelerator control is in a predetermined position. In addition to recovering the maximum kinetic energy, the arrangement also results in increased safety, since braking is initiated even before the brake pedal or any other control is touched, and braking occurs even in the event that all other braking systems fail.

In one specific embodiment, this recovery is accomplished through an alternator which is mechanically driven by the electric motor, which also drives the wheels, to recharge the storage batteries which furnish energy to drive the motor, whenever the accelerator pedal is in a position indicating that no pressure is being applied to it. This same embodiment can also be utilized for recharging the storage batteries from an exterior source by simply exciting the electric motor from the exterior source to mechanically drive the alternator and hence recharge the storage batteries.

The intermittent recharging, which results whenever the accelerator pedal is in the predetermined position, has a number of beneficial results. If conventional lead-acid batteries are utilized, horizontal layering or stratification of the electrolyte in the battery, which results in a number of layers of differing ratios of acid to water with the greatest amount of acid near the bottom, is substantially prevented by the constant circulation of the electrolyte which results from intermittent recharging. As a result, more of the acid is effectively used, and battery lifetime and efficiency increased. Furthermore, this constant circulation prevents the water produced during discharge from collecting at the surface of the plates and prevents conduction to and from the plates, thereby significantly stretching the lifetime and efficiency of the batteries.

Furthermore, the extra surface charge which the batteries receive in stopping or moving down hills makes extra power immediately available for a quick start with added acceleration. This is especially important since much more energy is required to accelerate the automobile than to move it at a constant rate. Extra power is then made available when it is most needed.

The batteries can also be recharged by pushing or pulling the automobile or by mechanically driving the wheels. This provides an alternative method of recharging the batteries when no electric power is available.

Also, the batteries can be simply and quickly recharged from an external source of alternating current. In the embodiment discussed in detail, this is accomplished by applying an external alternating current to a rectifier circuit wholly within the automobile and utilizing the rectified voltage thus produced to excite the electric motor. An alternator is then driven mechanically by the motor, producing an alternating current which is rectified and applied to the storage batteries. This particular arrangement produces quick and complete battery recharging whenever alternating current is available. Since the alternator produces a much higher current than the rectified external source, battery recharging time is substantially reduced.

BRIEF DESCRIPTION OF THE DRAWING

The figure shows a regenerative braking system for an electric automobile or vehicle whereby the storage batteries are recharged whenever the accelerator pedal is in a predetermined position and the vehicle is moving or the batteries are being recharged from an exterior source of voltage.

DETAILED DESCRIPTION OF THE DRAWINGS

This invention relates to a regenerative system for an electric automobile or vehicle whereby the batteries which store the energy used to move the vehicle are recharged whenever the accelerator control is in a predetermined position and the wheels are rotating or the batteries are being recharged from an exterior source of voltage.

Referring to the drawing, the DC motor 20 is excited electrically by applying a suitable DC voltage between lines 22 and 24. The motor 20 then drives a motor shaft 26 which in turn drives the axle 28 through a differential 30 to apply a torque to turn the two wheels 32 and 34.

The lines 22 and 24 originate in a control mechanism 36 which determines the amplitude of DC excitation which is applied to the motor 20, and hence the torque which the motor 20 applies to the wheels 32 and 34. An ignition switch 38, which would ordinarily be located on the dashboard, is adapted to prevent the excitation of motor 20 by disconnecting the line 24 from the control mechanism 36, for example to prevent operation of the vehicle by improper or unauthorized persons. The four 24-volt batteries 40, 42, 44 and 46 which actually store the energy necessary to move the vehicle are connected into the control mechanism 36 via lines 50, 52, 54, 56, 58, 60, 62, and 64, the control mechanism 36 operates to connect these four batteries, 40, 42, 44, and 46, in various parallel and serial arrangements in order to apply different amplitudes of DC excitation to the motor 20 in response to commands communicated through the accelerator control pedal 70. The control mechanism 36 is also able to reverse the electrical polarity of the lines 22 and 24, and thereby to drive the motor and hence the vehicle in reverse in response to further commands from a forward-reverse control (not shown) within the vehicle.

The level of DC excitation which is applied to the motor 20 is determined solely by the position of the accelerator control pedal 70. When this control pedal 70 is pushed to the neighborhood of its maximum limit, lines 72 and 74 are connected in series by the control mechanism 36 so that a potential of 96 volts is applied between lines 22 and 24 to excite the motor 20. This, of course, occurs when the driver 76 desires that maximum torque be applied to the wheels 32 and 34, for example, to start the car from a dead halt, and manifests this desire by pressing the pedal 70 to its maximum limit. When the pedal 70 is held by the driver 76 near a second position, the lines 80 and 72 are electrically interconnected so that, for example, the batteries 40 and 42 are connected serially and this serial connection is linked in parallel with the batteries 44 and 46 which are also serially connected, and 48 volts is thereby applied to the motor 20. This amplitude of excitation then results in considerably less torque being applied to the wheels 32 and 34 than would be applied in the first position. In yet a third pedal position, line 90 is connected to line 72 and the batteries 40, 42, 44 and 46 are connected in parallel so that just 24 volts is applied to the motor 20. Finally, when no pressure is applied to the foot pedal 70, the pedal is in a fourth position in which no voltage is applied between lines 22 and 24 from the control mechanism 36. The four positions are arranged so as to be mutually exclusive so that the pedal will always be in one, and only one position, and each of these positions directly reflects the torque which the driver 76 desires applied to the wheels 32 and 34.

When the pedal 70 is in that fourth position connecting line 72 to line 92, the batteries 40, 42, 44 and 46 are also connected in parallel to the copper bus bars 96 and 98 and are subjected to recharging provided that the motor shaft 26 is rotating and an on-off switch 100, located on the dashboard, is closed. The pedal 70 is constructed so that the pedal will automatically return to the fourth position unless continuous pressure is applied, with the result that recharging will ordinarily occur whenever foot pressure is removed from the pedal 70. When this switch 100 is closed and the pedal is in the fourth position, indicating no foot pressure is being applied, lines 92 and 72 are electrically connected and the 12-volt battery 102 is immediately available to operate the electromagnetic clutch 104 and the relays 106 and 108.

The relay 106 operates to close switches 110, 112, 114 and 116 and thereby to connect the positive terminals of the batteries 40, 42, 44 and 46 to the copper bus bar 98 whenever current flows through the relay 106. When the pedal is in that fourth position connecting lines 92 and 72 and the switch 100 is closed, current flows from the positive to the negative terminal of battery 102 via line 120, the off-on switch 100, the line 92, the line 122, which is connected to the line 72 and hence to the line 92, the lines 124 and 126 and finally the relay 106. Relay 108 operates similarly, closing switches 130, 132, 134 and 136, connecting the negative terminals of batteries 40, 42, 44 and 46 to the copper bus bar 96, whenever a current path is completed through the relay 108. This path, which runs from the negative terminal of battery 102, leads through line 120, closed switch 100, lines 92, 122, 124, and 140, through relay 108 and back to the positive terminal of battery 102 via line 142, and is similarly completed whenever the pedal is in that fourth position connecting lines 72 and 92.

The electromagnetic clutch 104 is also energized when the pedal is in that fourth position via a path leading from the positive terminal of battery 102 through line 144 to the clutch 104 and then through the potentiometer 148, the line 150 and back to the negative terminal through the line 122, the line 92, the switch 100, and the line 120. The potentiometer 148 reduces the voltage across the clutch 104 from 12 volts to 4 volts, a level of excitation which is necessary to prevent grabbing in this embodiment.

The energizing of the electromagnetic clutch 104 firmly grips the pulley 154 to the motor shaft 26. This pulley 154, which is not ordinarily driven by the motor shaft 26, is attached to another pulley 156 via a belt 158 so that pulley 156 rotates whenever pulley 154 does, but not necessarily at the same speed as pulley 154. Pulley 156 is attached to an alternator shaft 160, which drives an alternator 162 to produce alternating current voltage. This alternating current voltage is converted to a direct current voltage by a rectifier 164 which may be directly built into the alternator 162. This direct current voltage is then applied to the copper bus bars 96 and 98 through lines 168, 169, 170 and 171 to recharge the batteries 40, 42, 46, and 48. The voltage regulator 172 operates as a safety device to prevent damage to the batteries by overcharging.

Furthermore, in producing the alternating current, the alternator 162 applies a counter torque against the direction of rotation of the alternator shaft 160. This counter torque is communicated to the wheels 32 and 34 through the pulleys 154 and 156, the belt 158 and the differential 30 and axle 28. This counter torque attempts to rotate the wheels in a direction opposite to the actual direction of rotation, and immediately acts to reduce the speed of the wheels 32 and 34 and hence the vehicle speed. The amount of counter torque generated, and hence the rate of braking, can be predetermined by choosing the proper type of alternator.

Thus, whenever the vehicle is moving and it is desired to stop or slow the vehicle, the kinetic energy which would be otherwise dissipated as heat in the brakes is instead recovered and utilized to apply a quick charge to the storage batteries, as well as to safely and quickly brake the vehicle by applying a counter torque to the wheels 32 and 34. This provides an additional measure of safety since braking begins as soon as pressure is released from the accelerator pedal 70, allowing the pedal 70 to move into the fourth position connecting lines 70 and 92, and provides braking even if all other braking systems fail.

As discussed above, this intermittent charging improves battery life and effectiveness, thereby increasing the range and power of the vehicle. Also, the quick surface charge which the battery receives in stopping or slowing down is immediately available to accelerate the vehicle. In addition, the battery can be recharged simply by pushing or pulling the vehicle or by turning the wheels 32 and 34 by some other means.

Furthermore, this regenerative arrangement is especially useful for recharging the batteries 40, 42, 44 and 46 from an exterior alternating current source 180 which can be plugged into lines 182 and 184 to excite the motor 20. The alternating current produced by the exterior source 180 is converted to direct current by rectifier 186 which ordinarily is mounted on the vehicle. This direct current is then applied to lines 22 and 24 via lines 188 and 190, and the motor 20 is then excited from these lines 22 and 24. The differential 30 is disabled, or some other method is used to prevent the wheels 32 and 34 from turning. Further, if the accelerator pedal is in the fourth position connecting lines 92 and 72, which is the case if no one is pushing on the pedal 70, the electromagnetic clutch 104 and the relays 106 and 108 are energized, and the pulley 154 driven by the shaft 26. The alternator 162 and the built in rectifier 164 then produce a direct current voltage, the amplitude of which is determined by the amplitude of the converted alternating voltage produced by the rectifier 186, and apply this voltage directly to lines 168, 169, 170 and 171 to recharge the batteries 40, 42, 44, and 46. Since the alternator produces higher current at a more suitable voltage than the direct current applied to the lines 22 and 24 via lines 188 and 190 from the rectifier 186, recharging is accomplished much quicker in this embodiment than it can be accomplished by applying the direct current voltage from rectifier 186 directly to the batteries. In other embodiments it might prove simpler or more efficient to charge the batteries directly from the rectified exterior source. Thus, the same regenerative charging arrangement which serves to brake the wheels 32 and 34 and recover some of the kinetic energy of the vehicle also can be adapted to quickly recharge the batteries from an exterior source.

In summary, the DC motor 20 operates to turn wheels 32 and 34 whenever DC excitation is applied between lines 22 and 24. The control mechanism 36 varies the excitation applied by connecting the batteries 40, 42, 44 and 46 in various parallel and serial arrangements in response to commands from the accelerator control pedal 70. When no pressure is applied to the pedal 70, the battery 102 energizes the relays 106 and 108, which operate to connect the batteries 40, 42, 44 and 46 in parallel to the bus bars 96 and 98, and the clutch 104 which causes the motor shaft to drive the alternator 162. The alternator 162 produces an alternating current which is rectified and applied to the batteries 40, 42, 44 and 46. The motor shaft may be driven by movement of the vehicle or by excitation from an external voltage source 180, when no pressure is applied to the pedal 70.

Many modifications and changes are possible which would be obvious to a man of ordinary skill without departing from the spirit of the invention and therefore the invention is intended to be limited only by the scope of the appended claims.

What is claimed is:

1. In an electric vehicle of the type having a movable accelerator control, an electrical system comprising:
    an electric motor for operating said vehicle at a speed determined by the position of said accelerator control,
    a plurality of chargeable sources of direct current voltage for operating said motor,
    control means for connecting said sources in different arrangements to thus produce a single direct current voltage source having variable amplitude and for applying direct current voltage from said single source to said motor,
    switching means operatively connected with said accelerator control for causing said control means to connect said sources in said different arrangements and for connecting all of said sources in parallel when said movable control is in a predetermined position, and
    charging means responsive to vehicle movement and said switching means to charge said source at substantially the maximum rate at which charging can occur in the vehicle when said control is in said predetermined position.

2. A vehicle electrical system as in claim 1 wherein said predetermined position of said accelerator control is the position thereof of no voltage for said motor and wherein said switching means includes a switch connecting said charging means to said voltage sources at that motor no voltage position of the accelerator control.

3. A vehicle electrical system as in claim 1 wherein said movable accelerator control includes a foot accelerator pedal and said switching means includes a first switch which connects said charging means to said voltage sources when said foot pedal is released and at least a second switch which at that time disconnects said motor from said voltage source so as to effect charging of said voltage source at times when said vehicle is moving without the foot accelerator pedal being operated.

4. In an electric vehicle of the type having a movable accelerator pedal, an electric system comprising:
    an electrical motor for operating said vehicle at a speed determined by the position of said accelerator control,
    a chargeable source of voltage for operating said motor, charging means for charging said voltage source, and
    switching means response to different positions of said accelerator control for connecting said voltage source alternately to (A) said motor to effect operation of said vehicle as aforesaid and (B) said charging means for effecting charge of said voltage source as aforesaid, including a first switch which disconnects said motor from said voltage source and a second switch which substantially simultaneously connects said charging means to said voltage source for full charging of said source when said foot accelerator pedal is released.

5. An electrical vehicle regenerating system comprising:
    a movable accelerator control,
    a first source of direct current voltage,
    a motor shaft,
    a direct current motor operated by said first source to mechanically drive said shaft, resulting in the movement of said vehicle,
    switching means associated with said control,
    an alternator,
    mechanical clutch means operable whenever a source of electrical energy is connected to said clutch means so that said alternator is driven by said shaft so as to produce electrical current,
    a second source of direct current voltage,
    means for connecting said second source to said clutch means whenever said switching means indicates said pedal is in a predetermined position, and
    a rectifier circuit for rectifying the current produced by said alternator and applying the rectified current to said source.

6. A system as in claim 5 including a second rectifier circuit adapted to rectify alternating current from a source exterior to said vehicle and to apply the rectified voltage to said motor.

7. A battery charging system for an electric vehicle comprising:
    a source of direct current voltage,
    a motor shaft,
    a direct current motor adapted to mechanically drive said motor shaft when direct current voltage is applied to said motor,
    a first rectifying circuit adapted to operate on alternating current voltage from a source external to said automobile to produce a direct current voltage and to apply the direct current voltage thus produced to said motor,
    an alternator having an alternator shaft adapted to be driven by said motor shaft by mechanical means connecting said shafts, for producing an alternating current voltage and
    a second rectifying circuit adapted to rectify the alternating current voltage produced by said alternator to a direct current voltage and to apply the rectified voltage to said source of direct current voltage to recharge said source of direct current voltage.

8. A system for recharging batteries in an electric vehicle comprising:
a plurality of first sources of direct current voltage,
a motor shaft,
a direct current motor mechanically driving said motor shaft when direct current voltage is applied to said motor,
control means for connecting said first sources in different arrangements to produce a single direct current voltage source having variable amplitude, and for applying direct current voltage from said single source having variable amplitude to said motor,
an accelerator foot pedal,
switching means associated with said pedal for causing said control means to connect said first sources in said different arrangements and for indicating when no pressure is being applied to said pedal,
an alternator, having an alternator shaft adapted to be driven by said motor shaft for producing an alternating current voltage,
a first rectifier circuit adapted to convert the alternating current voltage produced by said alternator to direct current voltage and to apply the converted voltage to said first sources to recharge said first sources,
mechanical means connecting said alternator and motor shafts including a pulley on each shaft and a belt connecting said pulleys,
an electromagnetic clutch associated with the pulley on said motor shaft operable to cause said motor shaft to drive said alternator shaft when direct current voltage is applied to said clutch,
relay means operable to close a plurality of switches connecting said first sources in parallel when a source of direct current voltage is applied to said relay means,
a second source of direct current voltage adapted to be applied to said clutch and to said relay means when said switching means indicates no pressure is being applied to said pedal and
a second rectifier circuit adapted to rectify alternating current voltage from a source exterior to said vehicle to produce a direct current voltage and to apply the rectified voltage to said motor.

References Cited
UNITED STATES PATENTS

| | | | |
|---|---|---|---|
| 1,562,903 | 11/1925 | Miller | 318—382 X |
| 2,107,844 | 2/1938 | Abbott | 320—14 X |
| 3,190,387 | 6/1965 | Dow | 318—139 X |
| 3,257,600 | 6/1966 | Tolmie | 320—2 |
| 3,280,397 | 10/1966 | Bruns | 318—139 |
| 3,454,122 | 7/1969 | Grady | 318—139 X |

J D MILLER, Primary Examiner

J. M. GUNTHER, Assistant Examiner

U.S. Cl. X.R.

318—139, 303, 382; 320—7, 14